Aug. 6, 1929.                 R. MAYNE                  1,723,289
                        CIRCUIT CONTROL SYSTEM
                      Filed April 15, 1927        2 Sheets-Sheet 1
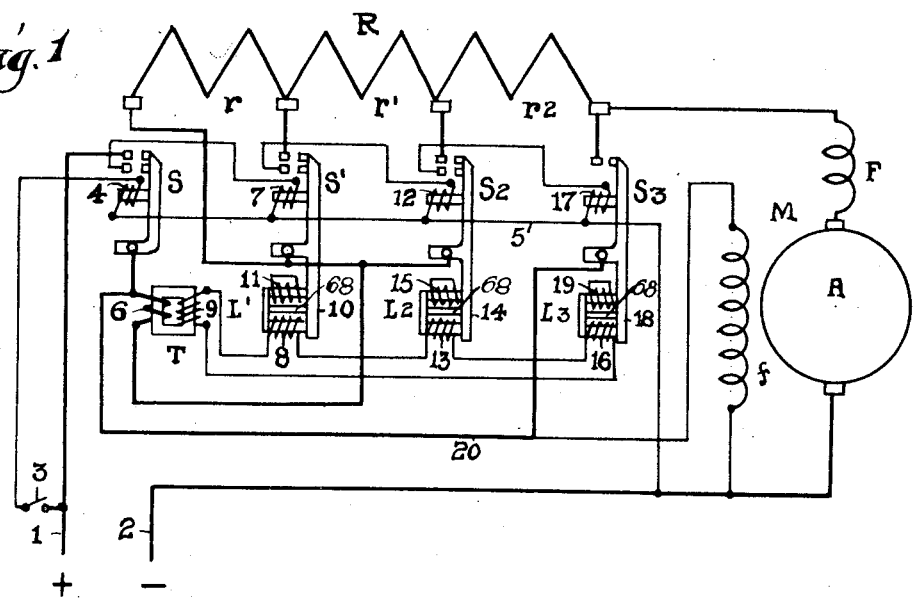
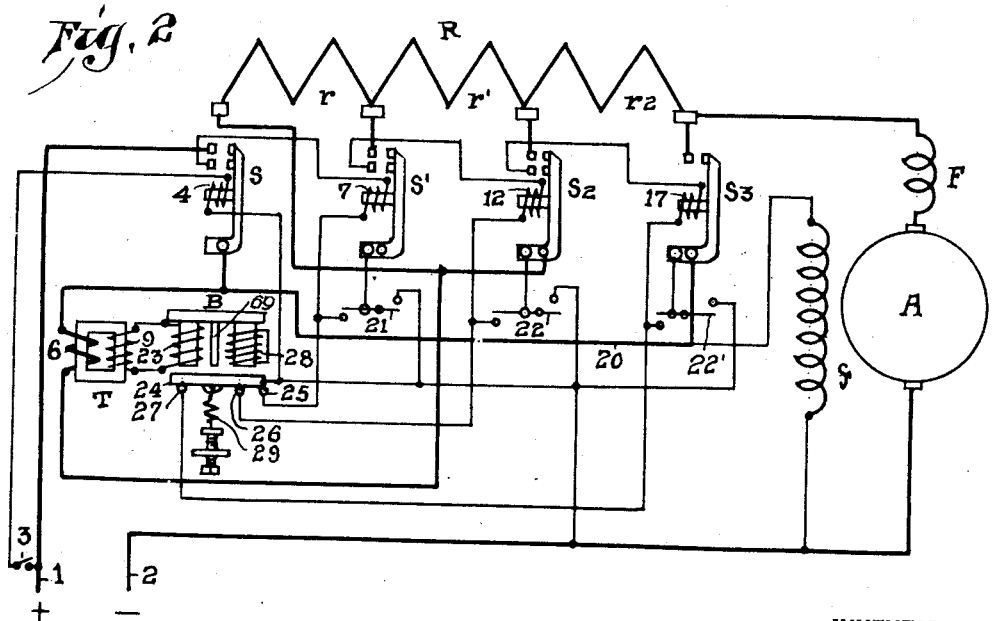
INVENTOR.
Robert Mayne
BY F. N. Barber
ATTORNEY.

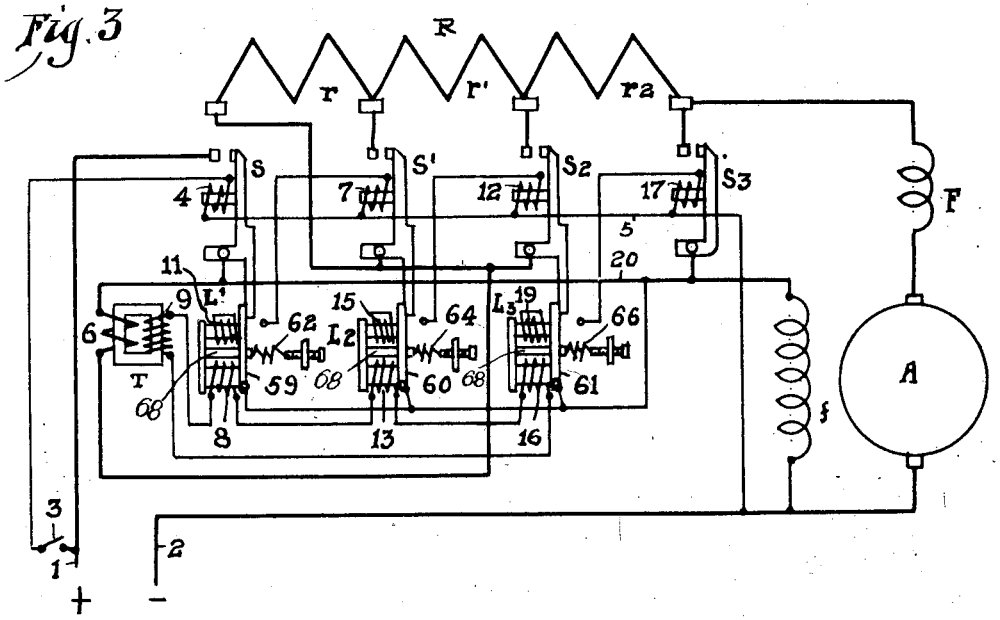
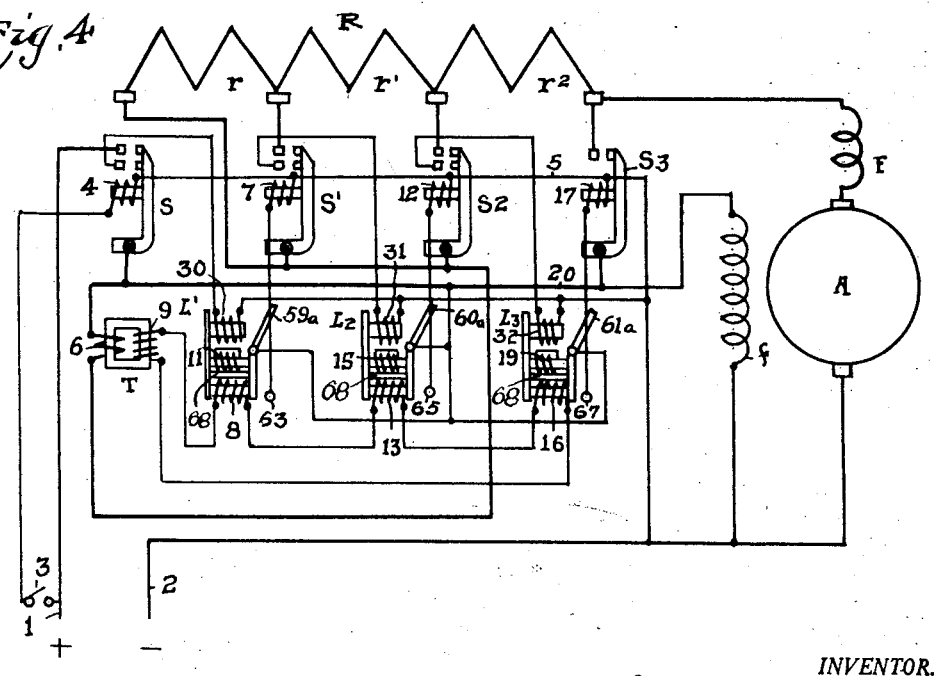

Patented Aug. 6, 1929.

1,723,289

UNITED STATES PATENT OFFICE.

ROBERT MAYNE, OF CLEVELAND, OHIO, ASSIGNOR TO THE ELECTRIC CONTROLLER & MANUFACTURING COMPANY, OF CLEVELAND, OHIO, A CORPORATION OF OHIO.

CIRCUIT-CONTROL SYSTEM.

Application filed April 15, 1927. Serial No. 184,139.

This invention relates to motor control systems wherein the acceleration of the motor is controlled by the rate of change of current in the motor or motor circuit.

It is one object of this invention to provide means whereby a system so controlled will lock out its accelerating contactors not only during the rise of motor current to its peak but also during the period that the rate of change of the motor current is passing through zero at its peak, and also during the time the rate of change of motor current is diminishing to zero or to a predetermined value above zero. I control the locking out of the contactors by means of electromagnetic lock-out devices or relays controlled by a transformer having its primary winding in the motor circuit or, subject to motor current conditions. Other objects appear hereinafter.

Referring to the accompanying drawings, the four figures show diagrammatically four of the many systems in which my invention may be utilized.

Referring first to Fig. 1, 1 and 2 are the positive and negative supply wires for the motor M having the armature A, the series field F and the shunt field $f$, it being understood that either of the fields may be omitted.

When the button or other hand switch 3 is closed, current flows from the positive supply wire 1 through the operating winding 4 of the switch S and the return wire 5 to the negative supply wire 2. Current in the winding 4 causes the switch S to close the motor circuit which is as follows: from the wire 1 through the switch S, the primary winding 6 of the transformer T, the resistance R, the series field F and the armature A to the wire 2. When the switch S closes it closes by its auxiliary contacts the operating winding 7 of the accelerating switch S' to the return wire 5. Current in the winding 7 would at once close the switch S' but for the electromagnetic lock-out device L' which has its lock-out winding 8 in series with the secondary winding 9 of the transformer T. The switch S' has a magnetic tail-piece 10 which is coursed by flux due to current in the winding 8 of the lock-out device L'. This flux locks the contactor S' open while the motor current is rising to its peak. While the current is passing at its peak through zero rate of change the tail-piece 10 is attracted to the lock-out device L' by flux due to the shading coil 11 on the lock-out device. The device L' has its magnetic circuit divided by the leg 68 so that the winding 8 is on one branch and the winding 11 is on the other branch. While the motor current is falling and the rate of change of motor current is decreasing, current generated in the secondary winding 9 flows through the lock-out winding 8 and holds the contactor S' open until the magnetic pull due to the winding 7 overcomes the decreasing opposing magnetic pull due to the winding 8. The design of the parts is such that the switch S' is closed somewhat in advance of the time when the decreasing rate of change of motor current reaches zero. This can be readily effected by those acquainted with the art of motor control and is therefore not illustrated and described.

Upon the closure of the contactor S' the section $r$ of the resistance R is short-circuited and a rapidly rising flow of motor current in the transformer winding 6 causes a rise of current in the closed lock-out circuit containing the secondary winding 9 and the winding 8 of the lock-out device L' and the winding 13 of the lock-out device L², the latter being constructed with a divided magnetic circuit such as the device L' has. When the contactor S' closes, its auxiliary contacts close the circuit of the operating winding 12 of the contactor S², but the parts are so constructed that the flux from the winding 13 attracts the tail piece 14 of the contactor S² before the flux from the winding 12 can close the contactor. The contactor S' being already closed remains closed against the pull due to the winding 8. The flux due to the winding 13 holds the contactor S² open during the rise of motor current; the shading coil 15 holds it open while the rate of change of current is passing through zero, and the winding 13 holds it open until the rate of change of motor current drops to a value at which the pull due to the winding 12 closes the contactor S².

The closure of this contactor cuts out the resistance section $r'$ and causes another rush of motor current through the winding 6 causing a rise of current in the aforesaid secondary winding 9 and the lock-out windings 8 and 13 and in the lock-out winding 16 of the lock-out device L³, the latter winding being in series in a loop with the windings 8, 9 and 13. The device L³ has like the devices L' and L² the magnetic leg 68 which divides the magnetic circuit the same as in the devices L' and L². The closing of the contactor S² completes through its auxiliary contacts the circuit of the operating winding of the contactor. S³. However, the tail-piece 18 of the contactor S³ is locked out by flux from the winding 16 before the flux from the winding 17 can close the contactor S³. The windings 7 and 12 hold the contactors S' and S² closed against the pull of their lockout device. The lock-out device L³ acts like the lock-out devices L' and L². Its winding 16 locks out the contactor S³ while the motor current is rising and while it is falling, the shading coil 19 holding the contactor open while the current is passing through zero change at peak. When the rate of change of current falls to a predetermined value the winding 17 causes the contactor S³ to close and cut out the last section $r^2$ of the resistance R. The motor current short-circuits the winding 6 through the wire 20 connected from the contactor S³ to a point between the contactor S and the transformer winding 6.

Referring now to Fig. 2, I use a multiple-contact lock-out relay B instead of the individual lock-out devices L', L² and L³ of Fig. 1. The frame of the lock-out relay B has like the lock-out device heretofore described, a magnetic leg 69 which divides the magnetic circuit into two branches, the winding 23 being on one branch and the winding 28 on the other branch. I supply the contactor S', S² and S³ with auxiliary switches 21, 22 and 22' to supply their operating windings 7, 12 and 17 with maintaining current when those contactors close and the relay contact 24 opens.

The motor current flows through the primary winding 6 of the transformer T. When the motor current is rising and falling, induced current will be generated in a closed circuit containing the secondary winding 9 of the transformer and the operating winding 23 of the relay or lock-out device B. When the motor current is rising, induced current traversing the winding 23 attracts the armature or contact 24 away from its fixed contacts 25, 26 and 27 and thereby opens the circuits of the windings 7, 12 and 17. While the motor current is passing through zero rate of change at its peak the shading coil 28 holds the contact 24 open. While the motor current is falling, the winding 23 causes the contact 24 to remain open until the rate of change of the motor current is too low to create a flux from the winding 23 sufficiently large to hold the contact 24 open against the pull of the spring 29 or equivalent means.

When the hand switch 3 is closed, the winding 4 is energized and causes the contactor S to close and complete the motor circuit through the contactor S, the winding 6, the resistance R, the series field F and the armature A to the wire 2. A rush of motor current ensues causing the transformer T to set up a current in the winding 23 which causes the contact 24 to open its contacts before the winding 7 whose circuit is closed by auxiliary contacts on the contactor S can close the contactor S'. The contact 24 is held open by the winding 23 and the shading coil 28, as described, until the rate of change of the motor current drops too low to maintain the contact 24 open. When the contact 24 closes it closes the circuit of the winding 7 through the relay contact 25, whereupon the contactor S' is closed and the section $r$ of the resistance is cut out. A rush of motor current follows; the contact 24 is again opened; and the switch 21 closes the maintaining circuit for the winding 7. The contact 24 is held open by the relay B as before until the rate of change of motor current is low enough to allow it to close. When it closes the circuit of the winding 12 is closed through the relay contact 26, and the contactor S² closes, cutting out the resistance section $r'$.

Another rush of motor current ensues and the contact 24 is opened as before. The circuit of the winding 17 remains open though closed by the auxiliary contacts on the contactor S², it being opened by the contact 24 at the contact 27. The contact 24 is held open as before while the motor current is rising, passing through its peak and falling. When the rate of change of motor current falls too low to maintain the contact 24 open, it closes and connects the winding 17 to the source of current supply. The contactor S² did not open when the contact 24 opened as the circuit of its holding winding 12 was closed by the switch 22 operated by the contactor S².

When the contactor S³ closes, it cuts out the last section $r^2$ of the resistance, the motor current now short-circuiting the winding 6 through the wire 20.

Referring now to Fig. 3, the system is similar to that of Fig. 1. In Fig. 3 the lock-out devices L', L² and L³ are the same as in Fig. 1 except that, instead of locking out the contactors by magnetic attraction of their tail-pieces, they are converted into relays having the armatures or movable contacts 59, 60 and 61 which, when released under the same current conditions as release the contactors in Fig. 1, close the circuits of the operating windings of the contactors. The contactors have tail-pieces which when the contactors are open hold the contacts of their respective relays open, so that when the relays are not energized, their contacts will always be open, so that there is no possibility of the operating windings of the succeeding contactors receiving current prematurely. The contactors in Fig. 3 do not have auxiliary contacts, as their functions are taken over by the relay contacts in Fig. 3.

The operation of the system of Fig. 3 is so similar to that of Fig. 1 that attention need be directed additionally to the operation of the relay contacts. When the switch 3 is closed the contactor S closes and completes the motor circuit. The tail-piece of the contactor S which has held the contact 59 open is moved away from the relay contact 59 but the latter is then held closed by flux due to the windings 8 and 11 until the rate of change of motor current decreases to a predetermined value, at which the spring 62 closes the contact 59 causing the winding 7 to receive current and the contactor S' to close and move its tail-piece away from the contact 60. The resistance section $r$ is cut out by the contactor S' and the motor current rises, causing the relay $L^2$ to lock out the contact 60 until the rate of change of the motor current drops to a predetermined value, when the spring 64 closes the contact 60. The winding 12 now receives current and the contactor $S^2$ closes, moving its tail-piece away from the contact 61 and cutting out the resistance section $r'$ from the motor circuit. The motor current causes the relay $L^3$ to lock out its contact 61 until the change of rate of motor current drops to a predetermined value, at which the spring 66 closes the contactor $S^3$. The motor circuit is now directly from the contactor S to the contactor $S^3$, whereby the transformer winding 6 is short-circuited.

Referring now to Fig. 4, the system shown is somewhat like that of Fig. 1, except that the tail pieces on the contactors in Fig. 1 have been omitted, that the lock-out devices of Fig. 1 control individual relay contacts, and that the auxiliary contacts on the contactors control windings 30, 31 and 32 on the lock-out devices or relays, these windings performing the functions of the springs which close the relay contacts in Fig. 3.

When the switch 3 is closed, the contactor S is at once closed, completing the motor circuit and the circuit of the winding 30. The rush of motor current causes the relay L' to lock out the contact $59^a$ until the rate of change of the motor current falls too low to prevent flux due to the winding 30 from closing the contact $59^a$ on its contact 63. The operating winding 7 of the contactor S' now receives current and this contactor closes, cutting out the resistance section $r$ and closing the circuit of the winding 31 on the relay $L^2$. The rush of motor current causes the relay to lock out the contact $60^a$ until the rate of change of the current diminishes to a predetermined value, at which the pull due to the winding 31 closes the contact on the contact 65, thereby closing the circuit of the winding 12. Thereupon the contactor $S^2$ is closed cutting out the resistance section $r'$ and closing the circuit of the operating winding 32 of the lock-out device $L^3$ which controls the operation of the contactor $S^3$. The increased motor current causes the relay $L^3$ to lock out the contact $61^a$ until the rate of change of the motor current drops to a predetermined value, at which the contact $61^a$ is closed on the contact 67 by flux due to the winding 32. The winding 17 is now energized and causes the contactor $S^3$ to close and cut out the last resistance section $r^2$. The motor circuit now flows in the wire 20, which short-circuits the transformer winding 6.

In general, upon the operation of any contactor which causes a rise of current in the motor circuit, the rate of change of current which may be considered as positive, is always above the releasing value of the lock-out device. When the motor accelerates, causing the motor current to change from an increasing current to a decreasing current, the rate of change of current passes through zero and becomes negative. The shading coil, due to the change of flux in the magnetic circuit with which it is associated prevents the release of the lock-out device while the rate of change of current passes through zero. Thereafter the rate of change of current is negative and gradually diminishes in value as the motor accelerates until it reaches a value equal to the releasing value of the lock-out device, thereby effecting the operation of the next acceleration contactor.

If, when the first contactor closes, insufficient current is admitted to the motor circuit for the motor to develop sufficient torque to accelerate the load, the current will remain constant after the first peak of current is reached. The rate of change of current then becomes zero and the lock-out device, or relay, will permit the closing of the second contactor after a definite time lag, thereby cutting out the first section of resistance. This admits more current to the motor circuit, the motor developing more torque which should start the load.

If the motor torque is still insufficient to start the load, the rate of change of motor current becomes zero after the second peak of current, and the lock-out device, or relay, will permit the next contactor to close after another definite time lag. As soon as the motor starts, upon closure of the contactor which allows sufficient current to flow to start the motor, the shading coil of the lock-out device which controls the succeeding contactor will prevent the operation of that contactor when the rate of change of current passes through zero while the current is changing from a rising value to a diminishing value and will permit that contactor to operate when the rate of change of current is at a predetermined value with diminishing current.

If the motor is stalled so that it cannot start, the overload devices commonly furnished with automatic motor starters will open the contactors before sufficient current flows to injure the motor or the control apparatus.

It is clear that the systems shown may be supplied with any suitable type of reverser.

I do not desire to be restricted to the combinations and details shown and described as many changes may be made within the scope of the appended claims.

I claim:

1. In a motor control system, a circuit, a motor therein, a transformer having its primary winding traversed by motor current, a resistance in the circuit, a contactor for cutting out a selected portion of the resistance, a magnetic device energized by the secondary circuit of the transformer, means for making the magnetic device effective to lock out the contactor while the rate of change of current exceeds a certain value on rising or falling current in the said circuit and means made effective by the change in flux in the magnetic device when the current changes from a rising to a falling value to maintain the magnetic device effective when the rate of change of current becomes zero in passing from a positive to a negative value.

2. In a motor control system, a circuit, a motor therein, a transformer having its primary winding traversed by motor current, a resistance in the circuit, a contactor for cutting out a selected portion of the resistance, a magnetic device having a divided magnetic circuit energized by the secondary circuit of the transformer and means cooperative between the magnetic device and the contactor and including a shading coil on one branch of the magnetic device for magnetically locking out the contactor continuously from the time current is supplied to the motor circuit until the rate of change of decreasing current falls to a predetermined value.

3. In a motor control system, a circuit, a motor therein, a transformer having its primary winding traversed by motor current, a resistance in the circuit, a contactor for cutting out a selected portion of the resistance, a magnetic device having a divided magnetic circuit energized by the secondary circuit of the transformer and means cooperative between the magnetic device and the contactor and including a shading coil on one branch of the magnetic device for magnetically locking out the contactor continuously from the time the motor circuit receives a surge of current until the rate of change of decreasing current falls to a predetermined value.

4. In a motor control system, a circuit, a motor therein, a transformer having its primary winding traversed by motor current, a resistance in the circuit, a contactor for cutting out a selected portion of the resistance, a magnetic device having a divided magnetic circuit energized by the secondary circuit of the transformer and means cooperating between the magentic device and the contactor for magnetically locking out the contactor ocntinuously from the time the motor circuit receives a surge of current until the rate of change of the current falls to a predetermined value, the said magnetic device having a shading coil for locking out the contactor while the rate of change of current is passing through zero value.

5. In an electric circuit, means for increasing the current in the said circuit in steps, means controlled by a translating device connected to the said circuit for gradually decreasing the current in the circuit after each step, a transformer whose primary winding is subject to rising and falling current in said translating device, an electro-responsive means having a divided magnetic circuit and controlled by the secondary circuit of the transformer, means cooperating with the electro-responsive means for preventing the operation of the said first means until the rate of change of current with decreasing current is below a predetermined value, and means automatically effecting the operation of the first means when the rate of change of current drops below the said value, in combination with a shading coil on one branch of the magnetic circuit for locking out the first means while the current is passing through zero rate of change on rising current.

6. In an electric motor control system, a motor circuit, a resistance therein, a plurality of electro-responsive devices for automatically cutting out the said resistance, a transformer having its primary winding traversed by motor current, electro-magnetic means having a divided magnetic circuit and energized by the secondary circuit of the transformer for locking out each electro-responsive device while the motor current is rising, passing through a maximum value and falling, means whereby the said electro-responsive devices overcome the electro-magnetic means only when the rate of change of motor current falls to a predetermined value, the said electro-magnetic means having on one branch thereof shading coil means for effecting the locking out of the electro-responsive device while the motor current is at its maximum.

7. In a motor control system, a circuit, a motor therein, a transformer having its primary winding traversed by motor current, a resistance in the circuit, a contactor for cutting out a selected portion of the resistance, a magnetic device having a divided magnetic circuit and a shading coil on one branch of the same and energized by the secondary circuit of the transformer and magnetically locking out the contactor while the rate of change of motor current is rising and passing through zero and falling to a predetermined rate of change, and means for closing the contactor when the rate of change of decreasing motor current falls to the predetermined value.

8. In an electric circuit, a pair of contacts, a contactor for operating the said contacts, a magnetic lockout device for the said contactor, a transformer whose primary is energized from the said circuit, a winding on the said magnetic lockout device energized by the secondary of the said transformer, and means energized by a change of flux in the said magnetic lockout device to make the said lockout device effective when the current in the said winding reverses.

9. In a circuit to be controlled, the combination of a contactor having contacts in the said circuit, a transformer having its primary in the said circuit, a magnetic lockout device for the said contactor comprising means controlled by the secondary current of the transformer for locking the contactor open while the current is increasing or decreasing in the said circuit, and means controlled by the change of flux in the magnetic circuit of the said lockout device for locking the contactor open when the current changes from an increasing to a decreasing value.

In testimony whereof, I hereunto affix my signature.

ROBERT MAYNE.